United States Patent Office 3,739,030
Patented June 12, 1973

3,739,030
2-HYDROXY-5-AMINO-BENZAMIDE
DERIVATIVES
Boris Gradnik and Andrea Pedrazzoli, Milan, and Leone
Dall'Asta, Pavia, Italy, assignors to Societe d'Etudes de
Recherches et d'Applications Scientifiques et Medicales
E.R.A.S.M.E., Paris, France
No Drawing. Filed June 17, 1970, Ser. No. 47,168
Claims priority, application Great Britain, June 20, 1969,
31,267/69
Int. Cl. C07c 103/30
U.S. Cl. 260—559 S
8 Claims

ABSTRACT OF THE DISCLOSURE 2-hydroxy-5-amino-benzamide derivatives of formula

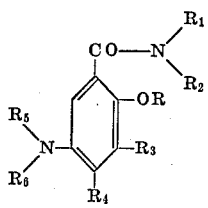

have a good muscle relaxant activity and a strong anti-inflammatory action. They are prepared by hydrolysis of the corresponding 5-acetamido-derivatives and optional subsequent alkylation, in any order. They can be included in pharmaceutical compositions in dosage unit form in amounts of from 50 to 500 mg.

The present invention relates to novel, therapeutically useful 2-hydroxy-5-amino-benzamide derivatives as well as to pharmaceutical compositions containing them as active ingredients in association with an inert carrier.

BACKGROUND OF THE INVENTION

Derivatives of 5-acetamido-salicylamide having sedative and tranquilising activity and useful as analgesics and barbiturate potentiators, have already been described by Pedrazzoli, Cipelletti and Dall'Asta (Chimie Thérapeutique 3, 200, 1968, British Patent No. 1,047,028).

SUMMARY OF THE INVENTION

It is now been found that by subjecting the above known compounds to a partial hydrolysis and, if desired, to an alkylation, there is obtained a new series of derivatives having a different kind of activity. More particularly, the present invention provides novel 2-oxy-benzamides having in the 5 position a free or alkylated amino group, characterized by the following general formula:

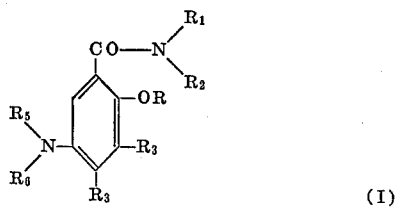

where R is an allyl or propargyl radical; $R_1$ is hydrogen or lower alkyl; $R_2$ is lower alkyl, lower alkenyl, cycloalkyl or ether of from 3 to 6 carbon atoms or $R_1$ and $R_2$, joined together form with the nitrogen atom to which they are attached, a pyrrolidino, piperidino or morpholino ring; $R_5$ and $R_6$ are each hydrogen or lower alkyl and at least one of $R_3$ and $R_4$ is hydrogen the other being able to be chloro or methyl; as well as pharmaceutically acceptable acid addition salts thereof.

The novel compounds of this invention show a good muscle relaxant activity and remarkable anti-inflammatory action, by far superior to that of dimethylaminophenazone.

DETAILED DESCRIPTION OF THE INVENTION

The terms "lower alkyl" and "lower alkenyl" as used herein, mean saturated and, respectively, ethylenically unsaturated alipahtic hydrocarbon radicals containing up to 5 carbon atoms, such as methyl, ethyl, propyl, isopropyl, n-butyl, sec.butyl, tert.butyl, n-pentyl, 2-methyl-butyl, 3-methyl-butyl, 2-ethyl-propyl, allyl, 2-methyl-allyl, crotyl, 2-methyl-crotyl and the like.

Pharmaceutically acceptable acid addition salts include those derived from organic and inorganic acids, such as acetic, propionic, lactic, tartaric, citric, maleic, malic, hydrochloric, hydrobromic, hydriodic, sulphuric and phosphoric acid, the hydrohalides, particularly the hydrochlorides, being particularly preferred.

According to the present invention, the compounds of Formula I above are prepared by a process which consists in subjecting the corresponding known 5-acetamido-derivatives of formula:

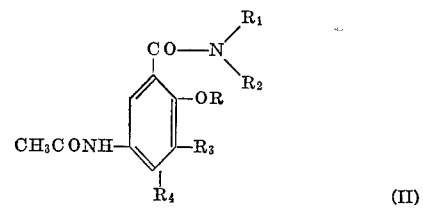

wherein R, $R_1$, $R_2$, $R_3$ and $R_4$ have the above-stated meanings to hydrolysis in acidic medium the nitrogen atom in 5-position of the benzene ring of derivatives of Formula I ($R_5=R_6=H$) thus obtained and of starting derivative of Formula II being able to be subjected to an alkylation reaction, alkylated and non-alkylated derivatives I being able to be transformed into acid addition salts.

The hydrolysis of the compounds II above is carried out in an aqueous mineral or organic acid, such as sulphuric, hydrochloric, phosphoric, perchloric, oxalic or p-toluenesulphonic acid, under stirring at a temperature of from 50 to 100° C., preferably around 90° C. The mixture is maintained under stirring for a period of time ranging from about 30 minutes to about 6 hours, preferably about 2 hours. It is advisable to add to the dilute acid a water-miscible solvent, such as an alcohol, in order to facilitate the dissolution of the product to be hydrolysed. The solution of the product to be hydrolysed. The solution obtained is made alkaline and the product can be separated, filtered and recrystallised one or more times from a suitable solvent.

If the product separated by the addition of the alkali is a liquid, it is extracted with a water-immiscible solvent, such as ethyl ether, benzene, hexane, chloroform or methylene chloride; the dried organic solution is concentrated under vacuum and the residual solid is recrystallised one or more times with a suitable solvent. If the residue from the concentration step is still a liquid, it is converted into a solid salt and recrystallised from a suitable solvent.

At the end of the reaction there is obtained a compound of Formula I above, in which both $R_5$ and $R_6$ are hydrogen. If desired, the compound thus obtained can be subjected to an alkylation reaction. To this end, the compound is reacted, according to well known procedures, with an alkylating agent, such as a lower dialkyl sulphate or lower alkyl halide, preferably iodide. At the end of the alkylation there is obtained a compound of Formula I above, in which both $R_5$ and $R_6$ are lower alkyl groups.

When both the hydrolysis and alkylation reactions are to be performed, the two steps can be carried out in an inverted order, by first treating the acetamino derivative II with an alkylating agent and then subjecting the compound thus obtained to hydrolysis, according to the procedures set forth above. At the end of the process a compound of Formula I is obtained, in which one of the substituents $R_5$ and $R_6$ is hydrogen and the other is lower alkyl.

The compounds thus obtained can then be converted into their pharmaceutically acceptable acid addition salts by reaction with mineral or organic acids, such as hydrochloric, hydrobromic, hydriodic, sulphuric, acetic, lactic, tartaric or citric acid according to methods well known in the art.

The compounds of the present invention have a low toxicity and significant pharmacological properties. More particularly, they exhibit a good muscle-relaxant activity in the test of the patellar reflex and a strong antiinflammatory action in the test of the inhibition of carrageenin-induced edema in the rat paw. As antiinflammatory agents, they exert an activity by far superior to that of dimethyl-aminophenazone and similar, in degree and kind, to that of phenylbutazone.

The new compounds have been orally administered to experimental animals, rats and mice, for three months in doses much higher than those having experimental or clinical pharmacological signification. Under these abnormal conditions the compounds of the invention did not induce any alteration in the gastric, hepatic, renal, metabolic, endocrine or haematopoietic functionality of the test animals. A histological examination did not reveal any significant variation in respect of the controls.

The compounds of the invention can be included in pharmacuetical compositions in dosage unit form containing from about 50 mg. to about 500 mg., preferably from 150 to 300 mg., of active ingredient per dosage unit in admixture with organic or inorganic pharmaceutical carriers suitable for oral administration such as starches, lactose, sucrose gelatin, magnesium stearate, talc, vegetable oils, gums and the like. They can be orally administered at daily dosages ranging from about 100 to about 800 mg. according to individual requirement.

In order further to illustrate the invention the following examples are given.

EXAMPLE 1

28.8 grams (0.1 mole) N-(n-butyl)-2-propargyloxy-5-acetamido-benzamide in 320 ml. of 4 N sulphuric acid was heated, under stirring, at 90–95° C. for two hours. The clear solution was cooled and its pH adjusted to 1 with N NaOH; after filtering, further alkali was subsequently added until a pH of 10 was obtained. At this point the product was separated by filtration and recrystallized from ethanol at 60° C. to give 16.6 grams (a yield of 68%) of chromatographically pure N-(n-butyl)-2-propargyloxy-5-amino-benzamide; M.P. 85–87° C.

EXAMPLE 2

32.5 grams (0.1 mole) N-allyl-2-allyloxy-3-methyl-5-acetamido-benzamide in 160 ml. of 2 N HCl was heated, under stirring, at 90° C. for 2 hours. When the solution became clear, it was cooled and made alkaline with 30% NaOH and subsequently extracted with 120 ml. of ethyl ether. The ethereal solution was dried with anhydrous $MgSO_4$ and concentrated under vacuum. The residual oil was dissolved in isopropyl ether and treated with hydrogen chloride in isopropanol. On separation, a solid was obtained, which was filtered and recrystallized from a mixture of isopropanol and isopropyl ether. 17.5 grams N-allyl-2-allyloxy-3-methyl-5 - amino - benzamide hydrochloride was obtained, melting at 178–180° C. Yield 61%.

EXAMPLE 3

A mixture of 27.6 grams (0.1 mole) N-(n-propyl)-2-allyloxy-5-acetamido-benzamide, 28 ml. of 10 N sulphuric acid and 28 ml. of 95° ethanol was heated, under stirring, at 50° C. for 7 hours. The clear solution was concentrated under vacuum to remove the alcohol, then cooled and treated with 30% NaOH to pH 10. The product was separated by filtration and recrystallized from ethanol at 60° C. to obtain 17.5 grams of pure N-(n-propyl)-2-allyloxy-5 - amino-benzamide; M.P. 93–95° C. Yield 75%.

EXAMPLE 4

29 grams (0.1 mole) N-sec-butyl-2-allyloxy-5-acetamido-benzamide in a mixture of 30 ml. of 4 N sulphuric acid and 30 ml. ethanol was heated at 100° C. for four hours under stirring to effect hydrolysis. The mixture was then concentrated under vacuum to remove the alcohol and made alkaline with 30% NaOH. The separated product was extracted with 220 ml. of diethyl ether and the ethereal phase was dried and concentrated to a residual solid. The crude product was recrystallized from isopropyl ether to obtain 18.3 grams N-sec. butyl - 2 - allyloxy-5-amino-benzamide, M.P. 121–121.5° C. Yield 73%.

EXAMPLE 5

29.7 grams (0.1 mole) N-ethyl-2-allyloxy-4-chloro-5-acetamido-benzamide in 140 ml. of 3 N HCl was heated at 100° C. for 45 minutes to effect hydrolysis. The solution was cooled and made alkaline. The solid separated, recrystallized from ethanol at 60° C., afforded 22.6 grams N-ethyl-2-allyloxy-4-chloro-5-amino-benzamide melting at 135–137° C. Yield 88%.

EXAMPLE 6

29.4 grams (0.1 mole) N-(n-butyl)-2-allyloxy-5-acetamido-benzamide was treated with 450 ml. of anhydrous xylol and 4.8 grams of a 50% oily suspension of sodium iodide. The mixture was heated at 120° C. for 1 hour, then cooled, and treated with 14.5 grams of methyl iodide. The reaction mixture was maintained at a temperature of 120° C. for 6 hours, then gently treated with ice and the organic phase separated and washed with water. The washed organic phase was dried and concentrated under vacuum to obtain 21 grams N-(n-butyl)-2-allyloxy-5-(N-methyl-acetamido)-benzamide as an oil which was hydrolysed by heating at 95° C. for 1 hour with 140 ml. of 2 N hydrochloric acid. The acid solution was then cooled, washed with ethyl ether, decolorized, filtered and made alkaline with 30% sodium hydroxide. The separated product was extracted with 220 ml. of ethyl ether, and the dried ethereal solution was acidified with gaseous hydrogen chloride to afford a solid product, which, after recrystallization from 95° C. ethanol, yielded 14.5 grams N-(n-butyl)-2-allyloxy - 5 - methylamino-benzamide hydrochloride; M.P. 153–155° C. Yield 48%.

EXAMPLE 7

A mixture of 14 grams (0.057 mole) N-(n-butyl)-2-propargyloxy - 5 - amino-benzamide and 60 grams (0.43 mole) n-butyl-bromide was heated to reflux for 16 hours. After cooling, the solid product obtained was separated by filtration and suspended in water. The suspension was neutralized with sodium bicarbonate and the gummy portion separated and extracted with ether. Gaseous hydrogen chloride was then bubbled through the ethereal solution and the product which separated was recrystallized from isopropanol to give 6.2 grams of N-(n-butyl)-2-propargyloxy - 5 - (N,N-dibutylamino)-benzamide hydrochloride as a whitish product melting at 178–180° C.

By operating as described in Examples 1–7 above, other representative compounds were prepared. Their characteristics are summarized in the following table.

TABLE I

| Ex. No. | R | -N(R1)(R2) | R3 | R4 | NR5R6 | Molecular formula (molecular weight) | Melting point (°C.) | Crystallization solvent |
|---|---|---|---|---|---|---|---|---|
| 8 | $-CH_2CH=CH_2$ | $-NH-CH_3$ | H | H | $NH_2$ | $C_{11}H_{14}N_2O_2$ (206.247) | 83-85 | Isopropyl ether. |
| 9 | $-CH_2-CH=CH_2$ | $-NH-CH_2CH_3$ | H | H | $NH_2$ | $C_{12}H_{16}N_2O_2$ (220.274) | 104-106 | Do. |
| 10 | $-CH_2-CH=CH_2$ | $-NH-CH_2CH_2CH_3$ | $-CH_3$ | H | $NH_2$ | $C_{14}H_{20}N_2O_2 \cdot HCl$ (284.789) | 175-178 | Isopropanol plus isopropyl ether. |
| 11 | $-CH_2-CH=CH_2$ | $-NH-CH(CH_3)_2$ | H | H | $NH_2$ | $C_{13}H_{18}N_2O_2$ (234.301) | 139-140 | Isopropyl ether. |
| 12 | $-CH_2-CH=CH_2$ | $-NH-CH(CH_2)(CH_2)$ (cyclopropyl) | H | H | $NH_2$ | $C_{13}H_{16}N_2O_2$ (232.285) | 138-139 | Do. |
| 13 | $-CH_2-CH=CH_2$ | $-NH-CH_2CH=CH_2$ | H | H | $NH_2$ | $C_{13}H_{16}N_2O_2$ (232.285) | 65-67 | Do. |
| 14 | $-CH_2-CH=CH_2$ | $-NH-(CH_2)_3CH_3$ | H | H | $NH_2$ | $C_{14}H_{20}N_2O_2$ (248.328) | 88-90 | Do. |
| 15 | $-CH_2-CH=CH_2$ | $-NH-(CH_2)_3CH_3$ | $-CH_3$ | H | $NH_2$ | $C_{15}H_{22}N_2O_2 \cdot HCl$ (298.816) | 173-175 | Isopropanol plus isopropyl ether. |
| 16 | $-CH_2-CH=CH_2$ | $-NH-(CH_2)_3CH_3$ | H | Cl | $NH_2$ | $C_{14}H_{19}ClN_2O_2$ (282.774) | 107-109 | Ethanol 50%. |
| 17 | $-CH_2-CH=CH_2$ | $-NH-CH_2-CH(CH_3)_2$ | H | H | $NH_2$ | $C_{14}H_{20}N_2O_2$ (248.328) | 122-124 | Ethanol. |
| 18 | $-CH_2-CH=CH_2$ | $-NH-C(CH_3)_3$ | H | H | $NH_2$ | $C_{14}H_{20}N_2O_2$ (248.328) | 100-101.5 | Isopropyl ether. |
| 19 | $-CH_2CH=CH_2$ | $-NH-C(CH_3)_3$ | H | Cl | $NH_2$ | $C_{14}H_{19}ClN_2O_2$ (282.774) | 142-144 | Ethanol 50%. |
| 20 | $-CH_2-CH=CH_2$ | $-NH-(CH_2)_4CH_3$ | H | H | $NH_2$ | $C_{15}H_{22}N_2O_2$ (262.355) | 84-86 | Isopropyl ether. |
| 21 | $-CH_2-CH=CH_2$ | $-NH-C_6H_{11}$ (cyclohexyl) | H | H | $NH_2$ | $C_{16}H_{22}N_2O_2 \cdot HCl$ (284.749) | 178-180 | Isopropanol. |
| 22 | $-CH_2-CH=CH_2$ | $-N(CH_3)_2$ | H | H | $NH_2$ | $C_{12}H_{16}N_2O_2 \cdot HCl$ (256.735) | 228-230 | Isopropanol plus ethanol. |
| 23 | $-CH_2-CH=CH_2$ | $-N(Et)_2$ | H | H | $NH_2$ | $C_{14}H_{20}N_2O_2 \cdot HCl$ (284.749) | 178-180 | Isopropanol. |
| 24 | $-CH_2-CH=CH_2$ | piperidino | H | H | $NH_2$ | $C_{15}H_{20}N_2O_2 \cdot HCl$ (296.800) | 202-204 | Do. |
| 25 | $-CH_2-CH=CH_2$ | morpholino | H | H | $NH_2$ | $C_{14}H_{18}N_2O_3 \cdot HCl$ (298.773) | 202-204 | Do. |
| 26 | $-CH_2-CH=CH_2$ | $-NH-CH_2CH_3$ | H | H | $-N(CH_3)_2$ | $C_{14}H_{20}N_2O_2 \cdot HCl$ (284.789) | 195-196 | Isopropanol plus ethyl acetate. |
| 27 | $-CH_2-C \equiv CH$ | $-NH-CH_3$ | H | H | $NH_2$ | $C_{11}H_{12}N_2O_2$ (204.231) | 98-99 | Isopropanol plus isopropyl ether. |
| 28 | $-CH_2-C \equiv CH$ | $-NH-CH_2CH_3$ | H | H | $NH_2$ | $C_{12}H_{14}N_2O_2$ (218.258) | 89-91 | Cyclohexane plus isopropanol. |
| 29 | $-CH_2-C \equiv CH$ | $-NH-CH_2CH_3$ | H | Cl | $NH_2$ | $C_{12}H_{13}ClN_2O_2$ (252.703) | 130-132 | Ethanol 50%. |
| 30 | $-CH_2-C \equiv CH$ | $-NH-CH_2CH_2CH_3$ | H | H | $NH_2$ | $C_{13}H_{16}N_2O_2$ (232.285) | 88-90 | Isopropyl ether plus benzene. |
| 31 | $-CH_2-C \equiv CH$ | $-NH-CH(CH_3)_2$ | H | H | $NH_2$ | $C_{13}H_{16}N_2O_2$ (232.285) | 118-120 | Isopropyl ether. |
| 32 | $-CH_2-C \equiv CH$ | $-NH-CH(CH_2)(CH_2)$ (cyclopropyl) | H | H | $NH_2$ | $C_{13}H_{14}N_2O_2$ (230.269) | 120-122 | Isopropanol. |
| 33 | $-CH_2-C \equiv CH$ | $-NH-(CH_2)_3CH_3$ | H | Cl | $NH_2$ | $C_{14}H_{17}ClN_2O_2$ (280.757) | 90-92 | Ethanol 50%. |
| 34 | $-CH_2-C \equiv CH$ | $-NH-C(CH_3)_3$ | H | H | $NH_2$ | $C_{14}H_{18}N_2O_2$ (246.312) | 91-93 | Isopropyl ether plus benzene. |
| 35 | $-CH_2-C \equiv CH$ | $-NH-(CH_2)_4CH_3$ | H | H | $NH_2$ | $C_{15}H_{20}N_2O_2$ (260.339) | 88-90 | Do. |

TABLE I—Continued

| Ex. No. | R | -N(R₁)(R₂) | R₃ | R₄ | NR₅R₆ | Molecular formula (molecular weight) | Melting point (°C.) | Crystallization solvent |
|---|---|---|---|---|---|---|---|---|
| 36 | $-CH_2-C\equiv CH$ | $-NH-CH_2-CH_2-CH(CH_3)CH_3$ | H | H | $NH_2$ | $C_{15}H_{20}N_2O_2$ (260.339) | 79-81 | Hexane plus benzene. |
| 37 | $-CH_2-C\equiv CH$ | $-N(CH_3)(CH_3)$ | H | H | $NH_2$ | $C_{12}H_{14}N_2O_2$ (218.258) | 121-123 | Isopropyl ether. |
| 38 | $-CH_2-C\equiv CH$ | $-N(Et)(Et)$ | H | H | $NH_2$ | $C_{14}H_{18}N_2O_2 \cdot HCl$ (282.773) | 202-204 | Isopropanol plus isopropyl ether. |
| 39 | $-CH_2-C\equiv CH$ | piperidino | H | H | $NH_2$ | $C_{15}H_{18}N_2O_2 \cdot HCl$ (304.784) | 236-238 | Ethanol. |
| 40 | $-CH_2-C\equiv CH$ | morpholino | H | H | $NH_2$ | $C_{14}H_{16}N_2O_3 \cdot HCl$ (296.757) | 234-237 | Do. |

What is claimed is:
1. A member selected from the group consisting of (a) 2-hydroxy-5-amino-benzamide derivative of formula

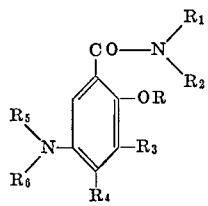

wherein R is allyl or propargyl; $R_1$ is hydrogen or lower alkyl having from 1 to 5 carbon atoms, $R_2$ is lower alkyl having from 1 to 5 carbon atoms, lower alkenyl having from 1 to 5 carbon atoms, cycloalkyl of from 3 to 6 carbon atoms or $R_1$ and $R_2$ form with the nitrogen atom to which they are attached a heterocyclic ring selected from the group consisting of pyrrolidino, piperidino and morpholino ring; $R_5$ and $R_6$ are each hydrogen or lower alkyl having from 3 to 5 carbon atoms; and at least one of $R_3$ and $R_4$ is hydrogen, the other being either hydrogen, methyl or chloro; and (b) a pharmaceutically acceptable acid addition salt thereof.

2. A member selected from the group consisting of N-(n-butyl)-2-propargyloxy-5-amino-benzamide and a non-toxic acid addition salt thereof.

3. A member selected from the group consisting of N-allyl-2-allyloxy-3-methyl-5-amino-benzamide and a non-toxic acid addition salt thereof.

4. A member selected from the group consisting of N-(n-propyl)-2-allyloxy-5-amino-benzamide and a non-toxic acid addition salt thereof.

5. A member selected from the group consisting of N-(sec.butyl)-2-allyloxy-5-amino-benzamide and a non-toxic acid addition salt thereof.

6. A member selected from the group consisting of N-ethyl-2-allyloxy-4-chloro-5-amino-benzamide and a non-toxic acid addition salt thereof.

7. A member selected from the group consisting of N-(n-butyl)-2-allyloxy-5-methylamino-benzamide and a non-toxic acid addition salt thereof.

8. A member selected from the group consisting of N-(n-butyl) - 2 - propargyloxy-5-di-n.butylamino-benzamide and a non-toxic acid addition salt thereof.

References Cited

UNITED STATES PATENTS 2,694,088 11/1954 Sahyun et al. _____ 260—559
3,262,946 7/1966 Moffett _____ 260—559

FOREIGN PATENTS 1,542,708 9/1968 France _____ 260—559
994,023 6/1965 England _____ 260—559

OTHER REFERENCES

Chemical Abstracts, vol. 67, article 32496r (Netherlands Patent 6605460) (1967) (p. 3064).
Chemical Abstracts, vol. 65, col. 14305a (Vacher et al.) (1966).

HARRY I. MOATZ, Primary Examiner

U.S. Cl. X.R.

260—247.5, 293.79, 326.85; 424—248, 267, 274

UNITED STATES PATENT OFFICE
CERTIFICATE OF CORRECTION

Patent No. 3,739,030           Dated June 12, 1973

Inventor(s) Boris Gradnik et al.

It is certified that error appears in the above-identified patent and that said Letters Patent are hereby corrected as shown below:

Column 7, line 41, "1" should read -- 3 --;

line 46, "3" should read -- 1 --.

Signed and sealed this 30th day of April 1974.

(SEAL)
Attest:

EDWARD M. FLETCHER, JR.
Attesting Officer

C. MARSHALL DANN
Commissioner of Patents